United States Patent [19]

Bruni et al.

[11] Patent Number: 5,834,883
[45] Date of Patent: Nov. 10, 1998

[54] FLAT SCREEN CATHODE INCLUDING MICROTIPS

[75] Inventors: Marie-Dominique Bruni, La Tronche; Jean-Frédéric Clerc, Saint Egreve, both of France

[73] Assignee: Pixel International SA, Rousset, France

[21] Appl. No.: 950,515

[22] Filed: Oct. 23, 1997

Related U.S. Application Data

[63] Continuation of Ser. No. 504,533, Jul. 20, 1995, abandoned.

[30] Foreign Application Priority Data

Jul. 21, 1994 [FR] France .................................. 94 09250

[51] Int. Cl.$^6$ ........................................................ H01J 1/30
[52] U.S. Cl. .......................... 313/309; 313/336; 313/351; 313/497
[58] Field of Search .................................... 313/309, 310, 313/336, 351, 355, 495, 496, 497

[56] References Cited

U.S. PATENT DOCUMENTS

| | | | |
|---|---|---|---|
| 4,721,885 | 1/1988 | Brodie | 313/308 X |
| 4,940,916 | 7/1990 | Borel et al. | 313/309 X |
| 5,057,047 | 10/1991 | Greene et al. | 313/309 X |
| 5,142,184 | 8/1992 | Kane | 313/309 X |
| 5,162,704 | 11/1992 | Kobori et al. | 313/309 X |
| 5,194,780 | 3/1993 | Meyer | 313/309 X |
| 5,525,857 | 6/1996 | Gnade et al. | 313/336 X |
| 5,536,993 | 7/1996 | Taylor et al. | 313/336 |

*Primary Examiner*—Ashok Patel
*Attorney, Agent, or Firm*—Plevy & Associates

[57] ABSTRACT

A cathode includes microtips for flat display screens, of the type including cathode conductors, between a substrate and a gate, the gate including holes inside meshes defined by the cathode conductors. An insulating layer, including wells facing the holes, is interposed between the cathode conductors and the gate. Microtips are deposited in the wells, onto a resistive layer. The cathode conductors are deposited over the resistive layer and are coated with an auxiliary insulating layer.

4 Claims, 5 Drawing Sheets

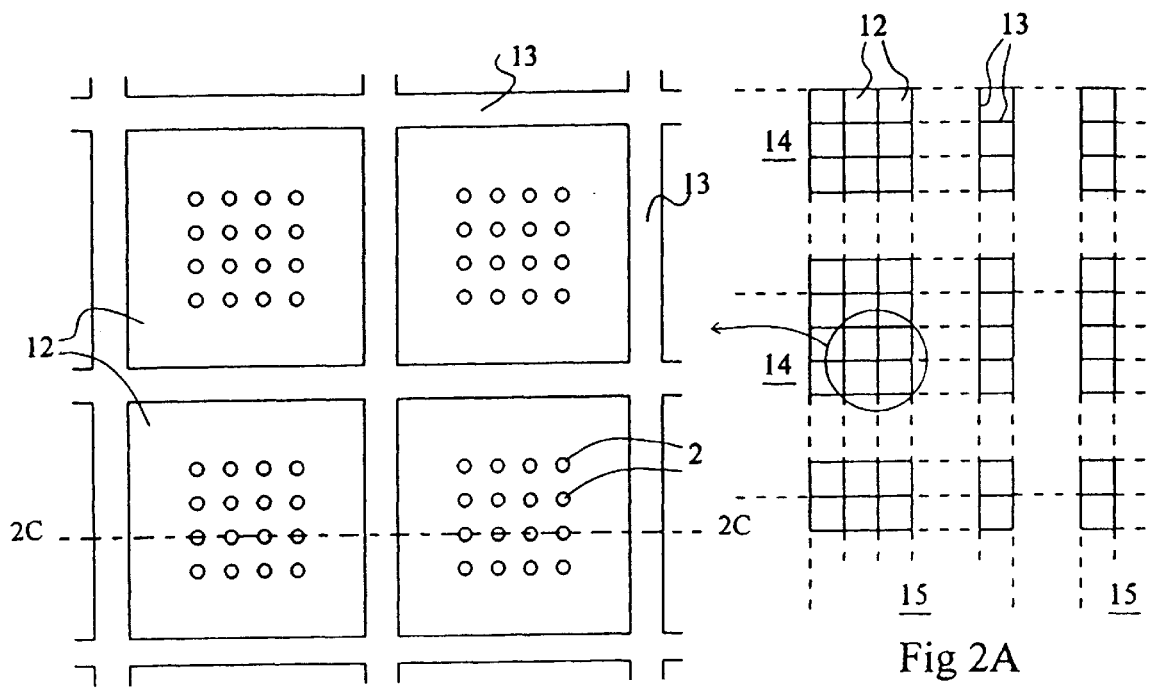
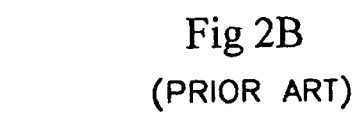
Fig 2B
(PRIOR ART)
Fig 2A
(PRIOR ART)
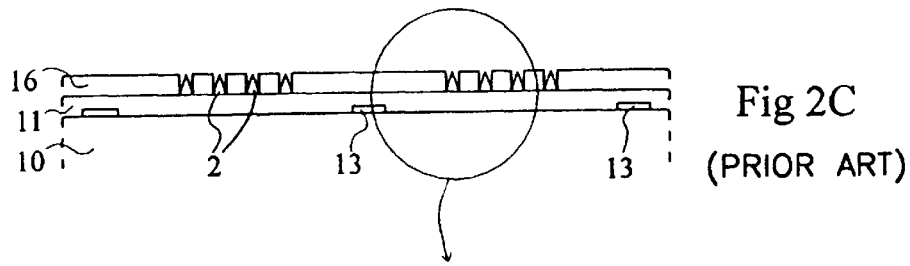
Fig 2C
(PRIOR ART)
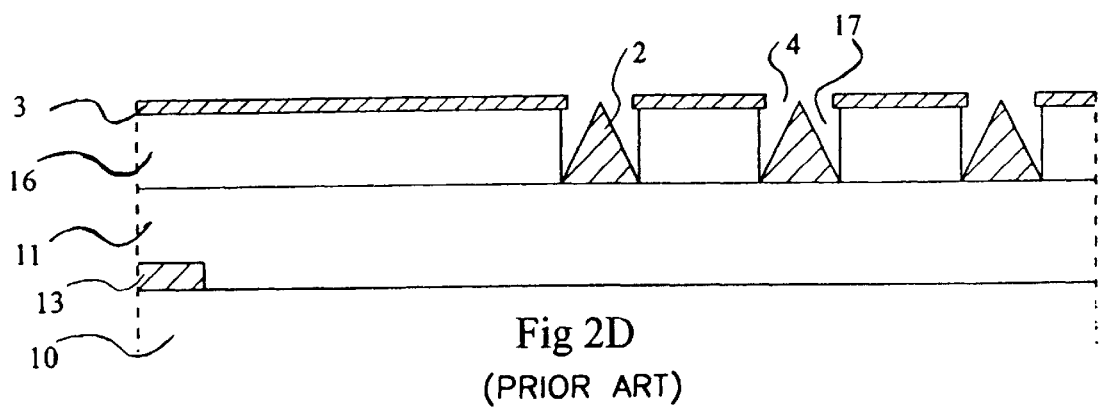
Fig 2D
(PRIOR ART)

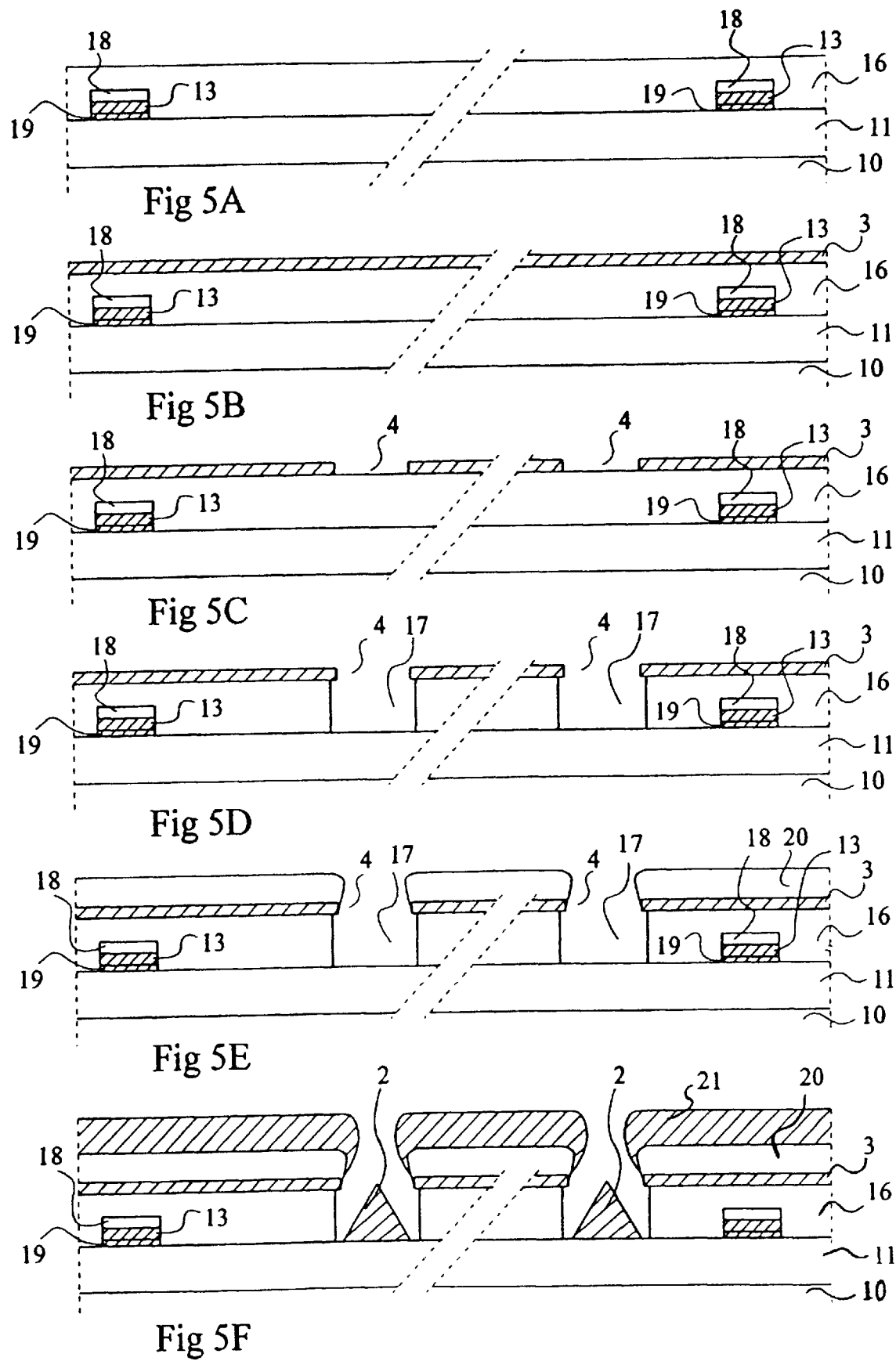

FLAT SCREEN CATHODE INCLUDING MICROTIPS

This is a continuation of application Ser. No. 08/504,533, filed on Jul. 20, 1995, entitled A FLAT SCREEN CATHODE INCLUDING MICROTIPS now abandoned.

BACKGROUND OF THE INVENTION

1. Field of the Invention

The present invention relates to the fabrication of a cathode including microtips, and more particularly relates to the fabrication of a cathode including microtips for bombardment of an anode of a flat display screen.

2. Discussion of the Related Art

FIG. 1 represents the structure of a flat microtip screen of the type to which the invention applies.

Such a microtip screen is mainly constituted by a cathode 1 including microtips 2 and by a gate 3 that is provided with holes 4 facing the microtips 2. The cathode 1 faces a cathodoluminescent anode 5 having a glass substrate 6 that constitutes the screen surface.

The operation and the detailed structure of such a microtip display are described in U.S. Pat. No. 4,940,916 assigned to Commissariat à l'Energie Atomique.

The cathode 1 is divided into columns and is constituted, on a glass substrate 10, by cathode conductors disposed in meshes made of a conductive layer. The microtips 2 are achieved on a resistive layer 11 that is deposited on the cathode conductors and are disposed inside meshes defined by the cathode conductors. FIG. 1 partially represents the inside of a mesh, the cathode conductors are not shown in this figure. The cathode 1 is associated with gate 3 which is arranged in rows. The intersection of a row of gate 3 and a column of cathode 1 defines a pixel.

The device uses the electric field generated between cathode 1 and gate 3 so that electrons are extracted from microtips 2 to phosphor elements 7 of anode 5. In the case of a color display, such as represented in FIG. 1, anode 5 is provided with alternate strips of phosphor elements 7, each strip corresponding to a color (red, green, blue). The strips are separated one from each other by an insulator 8. The phosphor elements 7 are deposited onto electrodes 9, that are constituted by corresponding strips of a transparent conductive layer, such as indium-tin oxide (ITO). The group of red, green, blue strips are selectively polarized with respect to cathode 1, so that the electrons extracted from the microtips 2 of one pixel of the cathode/gate are selectively directed toward the phosphor elements 7 facing each of the colors.

FIGS. 2A–2D illustrate an exemplary structure of the type, FIG. 2B and 2D are enlarged views of portions of FIG. 2A and 2C. Several microtips 2, for example 16, are disposed in each mesh 12 defined by the cathode conductors 13 (FIG. 2B). The intersection of a row 14 of gate 3 and a column 15 of cathode 1 corresponds in this case, for example, to 64 meshes 12 of one cathode pixel (FIG. 2A).

The cathode 1 is generally formed by layers successively deposited onto the glass substrate 10. FIGS. 2C and 2D are partial cross-sectional views along line 2C—2C of FIG. 2B. A conductive layer 13, for example made of niobium, is deposited onto substrate 10. The layer 13 is etched in a column pattern 15, each column including meshes 12 that are surrounded with cathode conductors 13. A resistive layer 11 is then deposited onto those cathode conductors 13. The resistive layer 11, made of amorphous silicon doped with phosphor, for example, is designed to protect each microtip 2 against an excessive triggering current flowing in a microtip 2. The deposition of such a resistive layer 11 aims at homogenizing the electron emission of microtips 2 of a pixel of cathode 1 and thereby at increasing its lifetime. An insulating layer 16 made, for example, of silicon oxide ($SiO_2$), is deposited onto the resistive layer 11 to insulate the cathode conductors 13 from gate 3 (FIG. 2D). Gate 3 is made of a conductive layer, for example niobium. Holes 4 and wells 17 are etched in layers 3 and 16, respectively, to accommodate the microptips 2 which are made, for example, of molybdenum.

A problem encountered in cathodes including microtips of this type is due to the defects of the insulating layer 16. These defects, especially in the silicon dioxide layers obtained by chemical vapor deposition (CVD) under normal pressure, correspond to "needle holes" in layer 16. The occurrence of "needle holes" in the insulating layer 16 may cause short-circuits between gate 3 and the cathode conductors 13.

SUMMARY OF THE INVENTION

An object of the present invention is to avoid this drawback by providing a new structure of cathode including microtips, which limits the risk for short-circuits due to defects of the insulating layer between the gate and the cathode conductors of flat display screens.

To achieve this object, the present invention provides a cathode including microtips for flat display screens, of the type including cathode conductors, between a substrate and a gate, the gate including holes inside meshes defined by the cathode conductors; an insulating layer, including wells facing the holes, being interposed between the cathode conductors and the gate; and microtips being deposited in the wells, onto a resistive layer. The cathode conductors are deposited over the resistive layer and are coated with an auxiliary insulating layer.

According to an embodiment of the invention, the auxiliary insulating layer is achieved by oxidizing the cathode conductors.

The invention also relates to a method for fabricating a cathode including microtips which consists of depositing a conductive layer, which is designed to form cathode conductors, over a pile constituted by at least one substrate and one resistive layer, and of coating this layer of cathode conductors with an auxiliary insulating layer.

According to an embodiment of the invention, the method consists of carrying out the following steps:

forming cathode conductors disposed in meshed columns onto a resistive layer deposited onto a substrate;

forming a gate including holes inside the meshes defined by the cathode conductors with interposition of an insulating layer, and depositing microtips onto the resistive layer, in wells formed in the insulating layer facing the holes in the gate.

According to an embodiment of the invention, the first phase of forming cathode conductors comprises the following steps:

depositing a resistive layer onto the whole substrate;

depositing over the whole plate a thin conductive etch-stop layer;

depositing over the whole plate a conductive layer of cathode conductors;

electrolytically oxidizing the conductive layer of cathode conductors;

simultaneously etching the layer of cathode conductors and the auxiliary insulating layer resulting from the above oxidation, in a pattern of meshed columns; and eliminating the etch-stop layer inside the meshes defined by the cathode conductors.

According to an embodiment of the invention, the electrolytic oxidation of the cathode conductor layer is achieved through a solution including ammonium pentaborate and ethyleneglycol, the oxidation thickness being mainly determined by the voltage applied during electrolysis.

According to an embodiment of the invention, the resistive layer is achieved by sputtering amorphous silicon doped with phosphor, the etch-stop layer being obtained by evaporation of chromium, the cathode conductor layer being obtained by niobium evaporation, and the auxiliary insulating layer being made of niobium pentoxide.

According to an embodiment of the invention, the cathode conductor layer and the auxiliary insulating layer are etched in a sulfur hexafluoride plasma; and the etch-stop layer is chemically etched in a mixture containing potassium permanganate and potassium hydroxide.

According to an embodiment of the invention, the second phase of fabrication of a gate and microtips includes the following steps:

depositing an insulating layer onto the whole structure provided by the first step;

depositing over the whole plate a gate conductive layer;

etching the gate conductive layer, according a row pattern, each row including holes in the meshes defined by the cathode conductors;

etching the insulating layer at the positions of the holes in the gate, so as to obtain wells to accommodate the microtips in this insulating layer;

electrolytically depositing a lift-off layer;

evaporating a conductive material so that microtips are deposited, onto the resistive layer, in the wells formed in the insulating layer; and eliminating residues of the conductive material through lift-off.

According to an embodiment of the invention, the. insulating layer is obtained by chemical vapor deposition under normal pressure of silicon oxide, the gate layer being obtained through evaporation of niobium, the gate layer being etched in a plasma of sulfur hexafluoride, the insulating layer being etched in a plasma of trifluoromethane, and the microtips are obtained through evaporation of molybdenum.

The foregoing and other objects, features, aspects and advantages of the invention will become apparent from the following detailed description of the present invention when taken in conjunction with the accompanying drawings.

BRIEF DESCRIPTION OF DRAWINGS

FIGS. 1 and 2A–2D, above described, illustrate the state of the art and the problem encountered;

FIGS. 5A–5F are schematic cross-sectional views of different steps of the implementation of the second phase of a process for fabricating a cathode including microtips according to the invention.

For the sake of clarity the figures are not drawn to scale.

DETAILED DESCRIPTION

Figure 1:
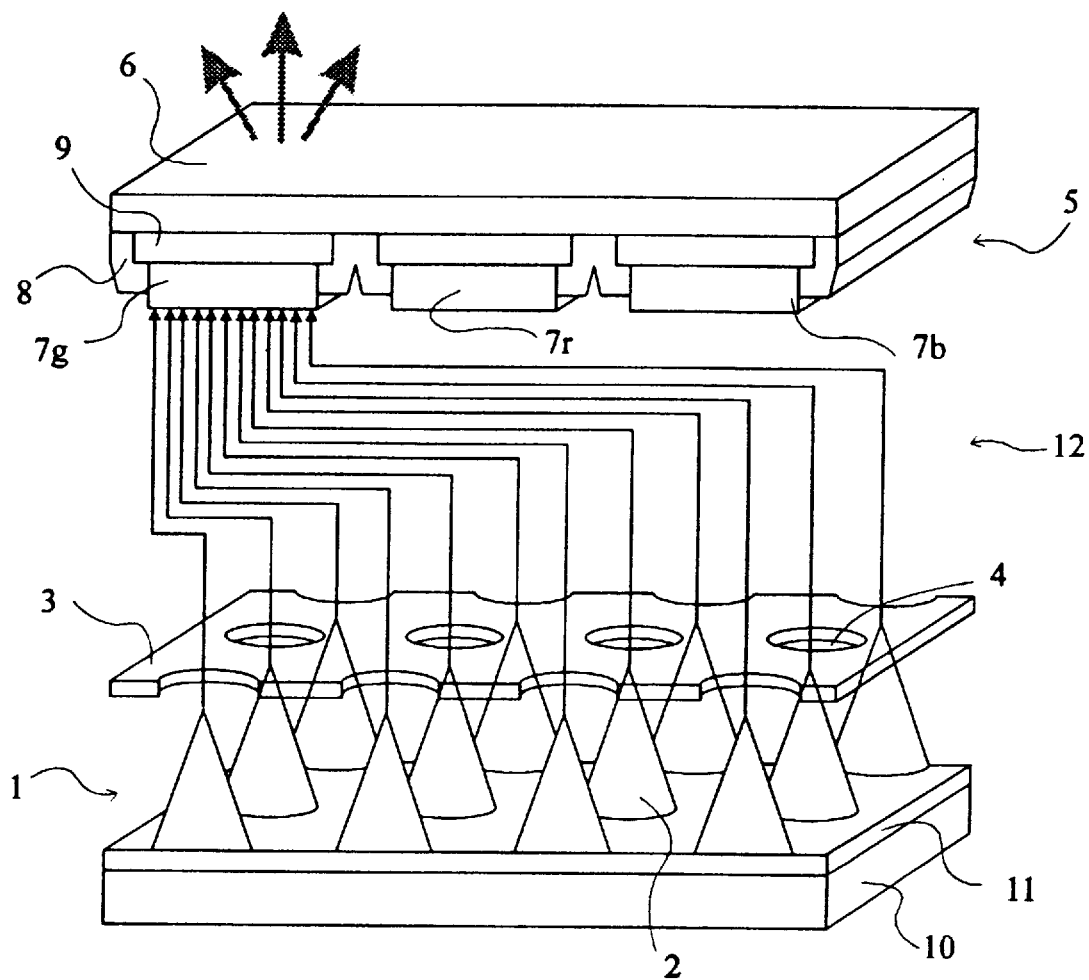
Figure 3:
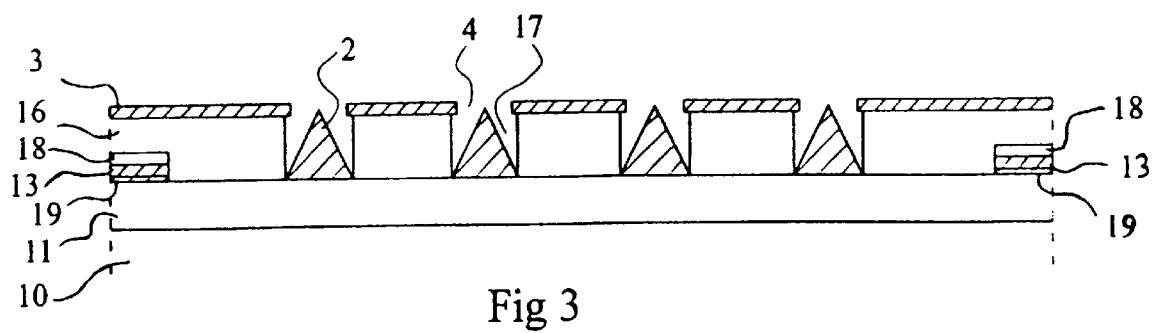
FIG. 3 is a partial cross-sectional view of a cathode including microtips according to the present invention.

FIG. 3 represents the structure of a cathode 1 according to the invention. The cathode 1 mainly differs from the microtip cathodes of the prior art in that the cathode conductors 13 are disposed over a resistive layer 11 and in that they are coated with an additional upper insulating layer 18.

Thus cathode 1, according to the invention, as represented in FIG. 3, includes, on a substrate 10, a resistive layer 11 receiving the microtips 2. The cathode conductors 13 are deposited onto the resistive layer 11 with, if required, interposition of a thin conductive layer 19. Column cathode conductors 13 are meshed as represented in FIGS. 2A and 2B. The cathode conductors 13 are coated with an auxiliary insulating layer 18 before the deposition of a layer 16 insulating the cathode conductors 13 from a gate 3. Holes 4 and wells 17 are, as previously, formed in gate layer and insulating layer 16 to receive microtips 2.

The provision of the auxiliary insulating layer 18 eliminates the "needle hole" effects that may occur on the insulating layer 16 perpendicularly to the surface of the cathode conductors 13.

The cathode thus obtained, according to the invention, still limits the current in the emitting microtips 2, through the resistive layer 11. Furthermore, the lifetime of the screen is still increased by avoiding short-circuits between the gate 3 and the cathode conductors 13.

According to a specific exemplary embodiment, the cathode conductors 13 have a width of approximately 2 μm, the distance between the cathode conductors 13 is approximately 25 μm. A pixel, defined by the intersection of a row 14 of gate 3 and a column 15 of cathode 1, includes 64 meshes 12 of cathode conductors 13. Each mesh 12 includes 16 microtips 2 disposed in the middle of mesh 12 with a pitch of approximately 3 μm between each microtip 2. The diameter of wells 17 is approximately 1.3 μm, and the base diameter of each microtip 2 is 1.1 μm.

An exemplary manufacturing method of such a cathode, according to the invention, will be disclosed hereinafter.

This process can be implemented in two phases corresponding to the fabrication of the cathode conductors 13, and to the fabrication of a gate 3 and microtips 2, respectively. The second phase corresponds to the conventional phase implemented for the fabrication of gate 3 and microtips 2.

FIGS. 4A–4F illustrate the implementation of the first phase which corresponds to the fabrication of the cathode conductors 13.

During a first step (FIG. 4A), a resistive layer 11 is deposited onto substrate 10.

Figure 4A:
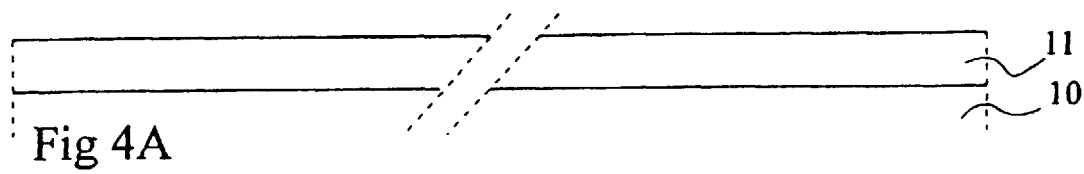
FIGS. 4A–4F are schematic and cross-sectional views of different steps of the implementation of a first phase of the process for fabricating a cathode including microtips according to the invention.
Figure 4B:
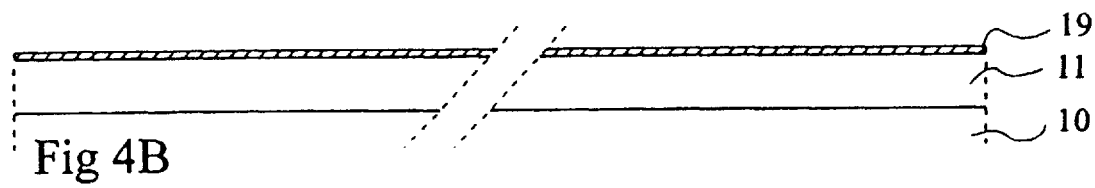
Figure 4C:
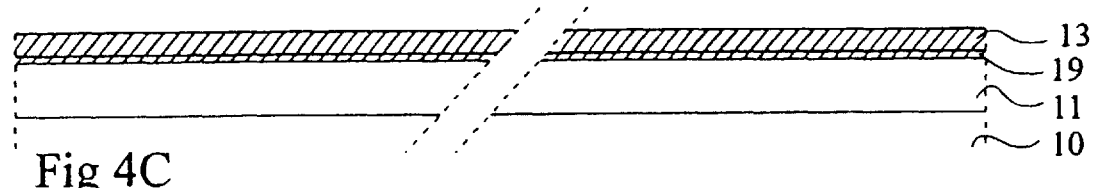
Figure 4D:
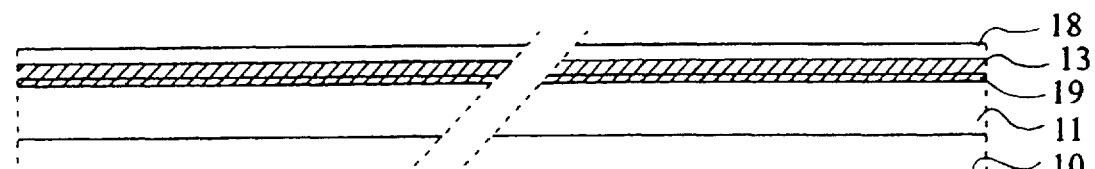

A second step (FIG. 4B) consists of depositing a thin, so-called etch-stop, conductive layer 19. Layer 19 has two functions. On the one hand, it constitutes an anchoring surface for the next layer (FIG. 4C). On the other hand, layer 19 ensures a stop for the etching which will be made on the upper layers to prevent the resistive layer 11 from being etched. The second function will be better understood hereinafter, with relation to the description of FIGS. 4E and 4F.

A third step (FIG. 4C) consists of depositing a conductive layer 13 which will constitute the cathode conductors. A characteristic feature of layer 13 is to be oxidable at its surface. The anchoring of layer 13 is enhanced by layer 19.

During a fourth step (FIG. 4D), an oxidation of the conductive layer 13 is achieved to obtain an auxiliary insulating layer 18. Care should be taken so that the thickness of layer 13, deposited during the third step, is sufficient to obtain an auxiliary insulating layer 18 while maintaining a sufficient thickness for the cathode conductors 13.

The four above described steps are achieved over the whole surface of substrate 10. As it can be noticed, the invention differs from the prior art, particularly in that the resistive layer 11 is deposited before the conductive layer 13, and in that an auxiliary insulating layer 18 is obtained through oxidation of the conductive layer 13.

Figure 4E:
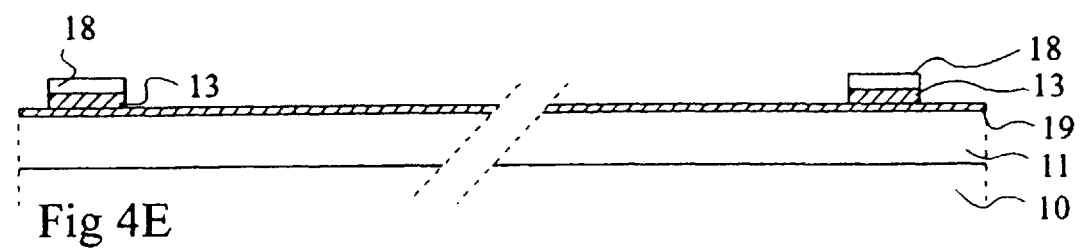
Figure 4F:
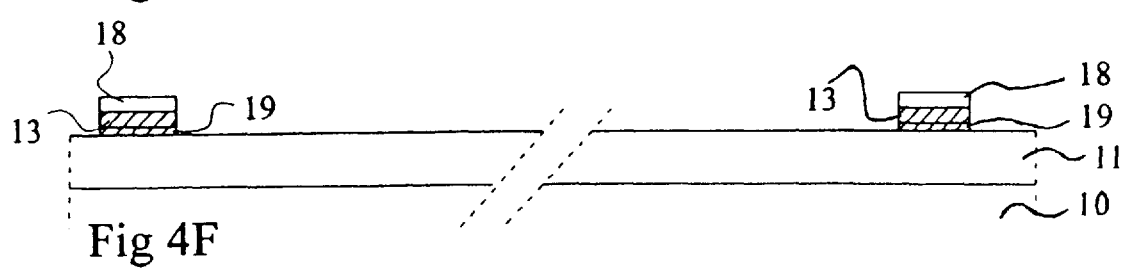

The cathode conductors are etched from the pile so obtained, during a fifth step (FIG. 4E). This step consists of simultaneously etching layers 13 and 18, so as to define meshed columns of cathode conductors 13 coated with an auxiliary insulating layer 18. Layer 19 ensures, during this step, stop of etching which prevents the resistive layer 11 from being etched.

Then, during a sixth step (FIG. 4F), layer 19 is eliminated at the positions where layers 13 and 18 have been etched, i.e., in meshes 12 delineated by the cathode conductors 13.

Cathode conductors 13 are thus formed. They have, for example, a width of approximately 2 μm. In order to complete cathode 1, the gate 3 and electron emission microtips 2 have still to be formed. The fabrication of gate 3 and microtips 2 is achieved in a second phase according to the steps of a conventional process.

FIGS. 5A–5F illustrate a second phase of the fabrication process of a cathode including microtips according to the invention, corresponding to a phase of fabrication of gate 3 and microtips 2.

During a first step (FIG. 5A) of the second phase, an insulation layer 16 is deposited onto the structure provided by the first phase.

During a second step (FIG. 5B), the gate layer 3 is formed by the deposition of a conductive layer. The deposition is obtained, for example, in the same way as the deposition of the layer of cathode conductors 13.

Then (FIG. 5C), gate rows 14 and holes 4 are etched in the gate layer 3 at the positions of the subsequent microtips 2, i.e., inside meshes 12 defined by the cathode conductors 13. The etching of the third step is carried out so as to etch the material of gate 3 without etching the material of the insulating layer 16. As explained above, the intersection of a row 14 of gate 3 with a column 15 of cathode 1 represents the surface of one pixel (FIG. 2A). In a specific example, 16 holes 4 are formed in each mesh 12 defined by the cathode conductors 13. The diameter of holes 4 is, for example, approximately 1.2 μm and their pitch is approximately 3 μm. The distance between a cathode conductor 13 and the nearest holes 4 is, for example, approximately 5.5 μm.

Once gate 3 is formed microtips 2 have to be formed to complete cathode 1.

During a fourth step (FIG. 5D), wells 17 are etched in insulating layer 16 facing holes 4 of gate 3. Etching is carried out so that the insulating layer 16 is etched at the positions of holes 4 without etching the resistive layer 11. The wells 17 have, for example, a diameter of 1.3 μm.

Then (FIG. 5E), a lift-off layer 20 is deposited onto gate 3. Layer 20 allows the elimination of the layer which will be subsequently deposited.

During a sixth step (FIG. 5F), microtips 2 are formed, for example by evaporation of a conductive material. The evaporation provides both the formation of a residual layer 21 onto the lift-off layer 20 and the formation of microtips 2 in wells 17. The microtip's shape is obtained by reducing the diameter of wells 17 during the former step. These microtips 2 have, for example, a base diameter of 1.1 μm and a height of approximately 1.2 μm.

A seventh and last step consists of eliminating the remaining layer 21, with the lift-off layer 20. Then, a cathode 1, as represented in FIG. 3, is obtained.

A specific implementation of a cathode including microtips with the specification of the used materials and etching processes, is disclosed hereinafter.

Phase 1:

Step 1: depositing over the whole substrate 10 a resistive layer 11, through sputtering of amorphous silicon doped with phosphor. The thickness of the resistive layer 11 is, for example, 1.6 μm.

Step 2: depositing over the whole plate, through chromium evaporation, a thin conductive layer 19. The thickness of layer 19 is, for example, 0.025 μm.

Step 3: depositing over the whole plate, through niobium evaporation, a layer of cathode conductors 13. The anchoring of layer 13 is enhanced by layer 19, because anchoring of niobium onto amorphous silicon is difficult to obtain. The conductive layer 13 has, for example, a thickness ranging from 0.2 to 0.4 μm.

Step 4: oxidation over the whole plate of layer 13. Oxidation is, for example, obtained My subjecting the niobium layer 13 to an anode oxidation in a solution including ammonium pentaborate ($NH_4B_5O_8.4H_2O$) and ethyleneglycol ($HOCH_2CH_2OH$). For this purpose, the pile is placed as an anode in an electrolytic bath of ammonium pentaborate and ethyleneglycol. The electrolysis medium is, for example, constituted of the following proportions: 156 grams of ammonium pentaborate for 1120 ml of ethyleneglycol and 760 ml of water, and has a pH of 5 to 6. A platinum counter-electrode, having the same surface as the niobium layer 13, is placed so as to face the surface of layer 13. The oxidation thickness depends practically only of the voltage at which is achieved the electrolyze. With a 40-V voltage, for example, a thickness of niobium pentoxide ($Nb_2O_5$) of 0.12 μm is obtained, which constitutes an auxiliary insulating layer 18.

Step 5: plasma etching in sulfur hexafluoride ($SF_6$) of the insulating layers 18 and conductive layers 13, in a pattern of columns 15 with meshes 12. Plasma etching is preferably achieved because a chemical (wet) etching of niobium pentoxide ($Nb_2O_5$) which constitutes layer 18 is difficult to control. In contrast, this oxide is etched with the same etching plasma as the one conventionally used to etch niobium. The used plasma also etches amorphous silicon, that is why layer 19 is referred to as an etch-stop layer and is formed in a material selected to be difficult to etch by the plasma of sulfur hexafluoride.

Step 6: eliminating layer 19, inside meshes 12, through masking and chemical etching including potassium permanganate ($KMnO_4$) and potassium hydroxide (KOH) which etches the evaporated chromium without damaging the adjacent layers.

Phase 2:

Step 1: depositing over the whole plate an insulating layer 16, through chemical vapor deposition (CVD) under normal pressure, of silicon oxide ($SiO_2$). The thickness of the insulating layer 16 is, for example, 1.3 μm.

Step 2: depositing over the whole plate a conductive gate layer 3, by niobium evaporation. The thickness of the gate layer 3 which corresponds to the thickness of the gate 3 ranges, for example, from 0.2 to 0.4 μm.

Step 3: etching in a plasma of sulfur hexaflouride ($SF_6$) layer 3, in a pattern of rows 14 of gate 3 and holes 4 defining the subsequent positions of microtips 2. The plasma is selected to etch niobium of layer 3 without etching the silicon dioxide ($SiO_2$) which constitutes the insulating layer 16.

Step 4: etching in a trifluoromethane (CHF$_3$) plasma wells 17 in the insulating layer 16, in register with holes 4 of gate 3. The plasma is selected so as to etch the silicon dioxide (SiO$_2$) which constitutes layer 16, without etching the amorphous silicon doped with phosphor which constitutes the resistive layer 11.

Step 5: depositing a lift-off layer 20, by electrolytically depositing nickel on the remaining surface of the gate layer 3.

Step 6: forming microtips 2, by evaporation of molybdenum.

Step 7: lift-off elimination of the molybdenum residues 21.

As is apparent to those skilled in the art, various modifications can be made to the above disclosed preferred embodiments. In particular, each component of a layer can be replaced with one or more components having the same characteristics and/or the same function. In addition, the etching means described by way of example can be replaced with other etching dry or wet means providing the same result.

In addition, the succession of exemplary steps can be modified according to the materials and means that are used for etching. The step for forming the auxiliary insulating layer 18 (phase 1, step 4) can be postponed after etching of the cathode conductors 13, the cathode conductors 13 then having oxidized edges.

Furthermore, the exemplary size indications can be modified as a function of the desired screen characteristics, the used materials, or other requirements. In particular, the present invention applies independently of the number of microtips 2 per mesh 12 of cathode conductors 13 and independently of the number of meshes 12 per pixel. A cathode 1 including, for example, only one microtip 2 per mesh 12 can be fabricated.

Having thus described at least one illustrative embodiment of the invention, various alterations, modifications and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

We claim:

1. A microtip cathode for flat display screens, comprising:
   a substrate;
   a layer of resistive material disposed on said substrate;
   a plurality of cathode conductors disposed on said layer of resistive material, said cathode conductors arranged in a mesh and coated with a first layer of insulating material;
   a second layer of insulating material coating said first layer of insulating material and said layer of resistive material;
   a gate layer disposed on said second layer of insulating material;
   a plurality of apertures extending through said gate layer and said second layer of insulating material to expose portions of said layer of resistive material; and
   a microtip disposed in each one of said apertures, said microtips in contact with said portions of said layer of resistive material.

2. The microtip cathode of claim 1, wherein said first layer of insulating material is obtained by oxidizing said cathode conductors.

3. The microtip cathode of claim 1, further comprising a thin conductive layer disposed between the cathode conductors and the layer of resistive material.

4. The microtip cathode of claim 1, wherein each one of said apertures defines a hole of a first diameter in said gate layer and a well of a second diameter in said second layer of insulating material, said second diameter being greater than said first diameter.

* * * * *